(12) United States Patent
Funamoto

(10) Patent No.: US 8,743,209 B2
(45) Date of Patent: Jun. 3, 2014

(54) IMAGE PICKUP APPARATUS AND METHOD FOR CONTROLLING THE SAME

(75) Inventor: Shohei Funamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 13/568,479

(22) Filed: Aug. 7, 2012

(65) Prior Publication Data

US 2012/0300083 A1 Nov. 29, 2012

Related U.S. Application Data

(63) Continuation of application No. PCT/JP2012/056348, filed on Mar. 13, 2012.

(30) Foreign Application Priority Data

Mar. 17, 2011 (JP) .................................. 2011-059425

(51) Int. Cl.
*H04N 5/225* (2006.01)
*G02B 27/00* (2006.01)
*H04N 5/232* (2006.01)

(52) U.S. Cl.
CPC ........ *G02B 27/0093* (2013.01); *H04N 5/23212* (2013.01)
USPC ........................................................ 348/169

(58) Field of Classification Search
None
See application file for complete search history.

(56) References Cited

U.S. PATENT DOCUMENTS

| 7,088,865 | B2 * | 8/2006 | Ejima et al. | 382/232 |
| 2004/0156724 | A1 * | 8/2004 | Torigoe et al. | 416/241 R |
| 2012/0206640 | A1 * | 8/2012 | Nakagawara | 348/345 |
| 2012/0301125 | A1 * | 11/2012 | Ashida | 396/95 |

FOREIGN PATENT DOCUMENTS

| JP | 2009-139795 A | 6/2009 |
| JP | 2009-175821 A | 8/2009 |
| JP | 2010-072283 A | 4/2010 |

* cited by examiner

*Primary Examiner* — Nhon Diep
(74) *Attorney, Agent, or Firm* — Canon U.S.A., Inc. IP Division

(57) ABSTRACT

An image pickup apparatus is provided which realizes an improvement in the accuracy of a subject tracking function of the image pickup apparatus during continuous shooting. This image pickup apparatus includes an image pickup unit configured to capture a plurality of auxiliary images during an interval between capturing of a main image and capturing of a next main image; a first subject tracking processing unit configured to detect a region where a subject that is the same as a main subject exists, from a first region that is a part of a first auxiliary image among the plurality of auxiliary images; and a second subject tracking processing unit configured to detect a region where a subject that is the same as the main subject exists, from a second region of a second auxiliary image among the plurality of auxiliary images, the second region being larger than the first region.

11 Claims, 12 Drawing Sheets

IMAGE PICKUP APPARATUS AND METHOD FOR CONTROLLING THE SAME

CROSS-REFERENCE TO RELATED APPLICATIONS

This application is a Continuation of International Patent Application No. PCT/JP2012/056348, filed Mar. 13, 2012, which claims the benefit of Japanese Patent Application No. 2011-059425, filed Mar. 17, 2011, both of which are hereby incorporated by reference herein in their entirety.

TECHNICAL FIELD

The present invention relates to an image pickup apparatus having a subject tracking function and a continuous shooting function of continuously capturing a plurality of still images, and to a method for controlling the same.

BACKGROUND ART

The brightness of a subject or the position of a subject changes over time. For this reason, when continuous shooting of still images is performed by using an image pickup apparatus having a continuous shooting function, exposure and focus have to be adjusted every time a still image is captured. Accordingly, there exist image pickup apparatuses that determine an exposure adjustment value for a following still image on the basis of a still image that was captured immediately before, and image pickup apparatuses having a function of performing continuous shooting while automatically adjusting exposure and focus by using information obtained from an AE (auto exposure) sensor, an AF (auto focus) sensor, and so forth, which are provided separately from an image pickup element. Further, there exist cameras having functions, such as of tracking a subject by using image data acquired during continuous shooting and of detecting information about a person's face.

For example, PTL 1 below describes a single-lens reflex camera that, in the continuous shooting mode, detects a subject from a still image that was captured immediately before and captures a still image of the next frame with the focus being set to follow this subject.

CITATION LIST

Patent Literature

PTL 1 Japanese Patent Laid-Open No. 2010-72283

However, in the technique described in PTL 1 above, one mirror-down operation is performed between when an image for use in a subject detection process is captured and when a focus detection process is performed on the basis of the position of the subject. Because there is a certain time lag between when the subject is detected and when focus information at the position of the subject is obtained, an unallowable difference may be caused between the position of the subject at the time of the subject detection process and the position of the subject at the time of the focus detection process. Accordingly, it is considered that there still is room for improvement regarding the subject tracking function of image pickup apparatuses.

Also in mirrorless single-lens reflex cameras which do not include such a mirror, the shorter the time from when detection of a subject is started to when focus adjustment is performed on the subject, the further the above-described difference can be suppressed.

The present invention is made in view of such a drawback, and it is an object thereof to provide a mechanism that realizes an improvement of the subject tracking function of image pickup apparatuses during continuous shooting.

SUMMARY OF INVENTION

The invention according to claim 1 of the present invention is an image pickup apparatus that captures a plurality of main images in a continuous shooting mode. The image pickup apparatus includes an image pickup unit configured to capture a plurality of auxiliary images during an interval between capturing of a main image and capturing of a next main image; a main subject determining unit configured to determine a main subject; a first subject tracking processing unit configured to detect a region where a subject that is the same as the main subject exists, from a first region that is a part of a first auxiliary image among the plurality of auxiliary images; and a second subject tracking processing unit configured to detect a region where a subject that is the same as the main subject exists, from a second region of a second auxiliary image among the plurality of auxiliary images, the second region being larger than the first region, wherein a result of the detection performed by the first subject tracking processing unit is used in focus adjustment that is performed before the capturing of the next main image, and a result of the detection performed by the second subject tracking processing unit is used in detection of a region where a subject that is the same as the main subject exists, the detection being performed after the capturing of the next main image.

Further features of the present invention will become apparent from the following description of exemplary embodiments with reference to the attached drawings.

DESCRIPTION OF EMBODIMENTS

Preferred embodiments for carrying out the present invention will be described below with reference to the drawings.

First Embodiment

First, an image pickup apparatus according to a first embodiment of the present invention will be described with reference to FIG. 1 through FIG. 6.

Figure 1:
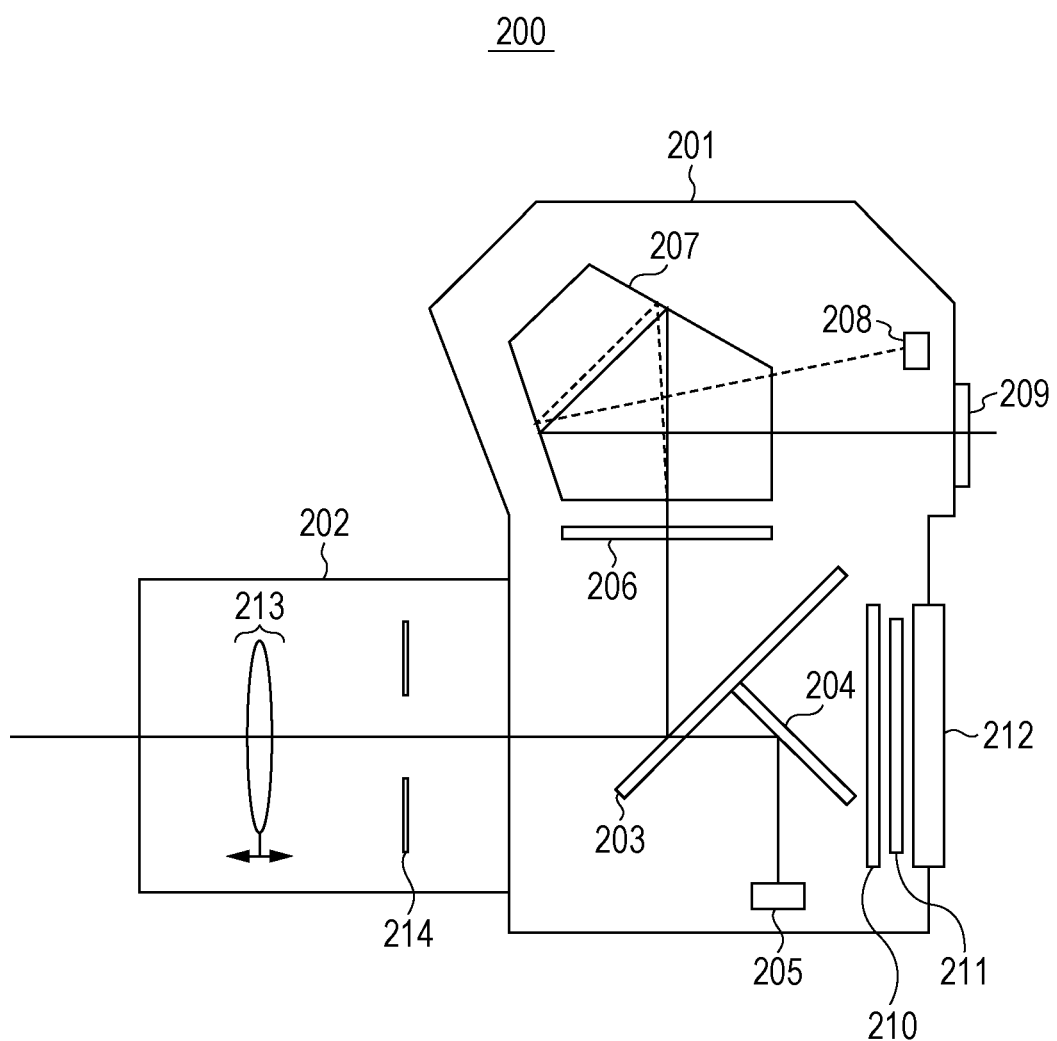
FIG. 1 is a schematic diagram illustrating an example of a mechanical configuration of an image pickup apparatus according to a first embodiment.

FIG. 1 is a schematic diagram illustrating an example of a mechanical configuration of a digital single-lens reflex camera, which is the image pickup apparatus according to the first embodiment.

In an image pickup apparatus 200 of FIG. 1, an image-capturing lens unit 202 is attached to a front face of a camera body 201. In the camera body 201, the image-capturing lens unit 202 to be attached is interchangeable with another image-capturing lens unit. This camera body 201 and the image-capturing lens unit 202 perform communication via mount contact points, not illustrated. The image-capturing lens unit 202 includes a group of lenses 213 and an aperture 214 therein. The camera body 201 is capable of adjusting an amount of light taken into the camera by adjusting an open diameter of the aperture 214 and of adjusting a focal position by adjusting the position of the group of lenses 213, through communication-based control via the mount contact points.

A main mirror 203 is constituted by a semitransparent mirror. This main mirror 203 is tilted in an image capturing optical path except during main image capturing in which a still image is captured. In this state, part of the flux of light coming from the image-capturing lens unit 202 is reflected by the main mirror 203 and is led to a viewfinder optical system, whereas the remaining flux of light that has passed through the main mirror 203 is reflected by a sub mirror 204 and is led to an AF unit 205.

The AF unit 205 is constituted by an AF sensor based on a phase-difference detection method. The AF unit 205 forms a secondary imaging plane of the image-capturing lens unit 202 on a focus detection line sensor. The camera body 201 detects a focus adjustment state of the image-capturing lens unit 202 from the output of the focus detection line sensor, and outputs a control signal for driving the group of lenses 213 on the basis of the detection result, thereby performing automatic focus adjustment. Since focus detection based on the phase-difference detection method is the known art, a description regarding concrete control is omitted here.

Figure 2:
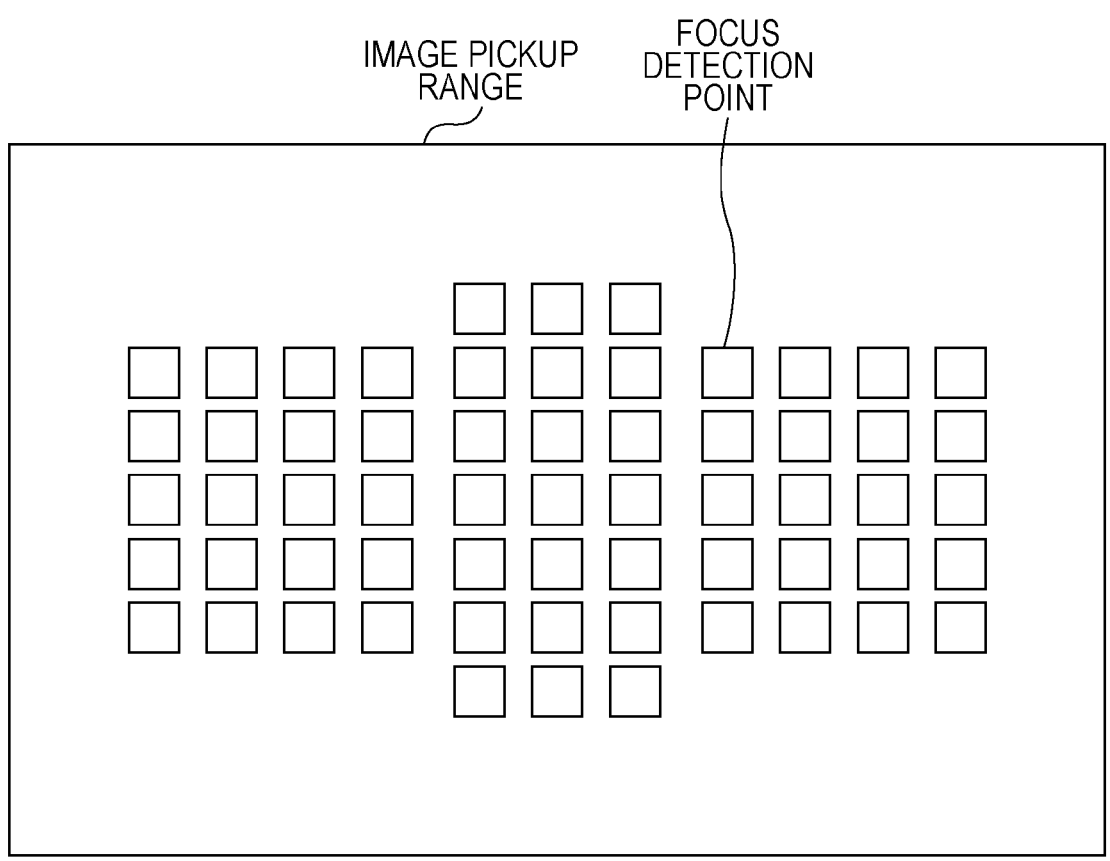
FIG. 2 is a schematic diagram illustrating a layout of focus detection points of the image pickup apparatus according to the first embodiment.

FIG. 2 is a schematic diagram illustrating a layout of focus detection points of the image pickup apparatus according to the first embodiment.

The AF unit 205 has, for example, the layout of focus detection points illustrated in FIG. 2.

A focusing screen 206 of FIG. 1 is arranged at an expected imaging plane of the image-capturing lens unit 202 that constitutes the viewfinder optical system. A pentaprism 207 is a pentaprism for changing the viewfinder optical path.

A cameraman observes the focusing screen 206 through an eyepiece 209, thereby being able to visually recognize a subject to be captured.

An AE unit (AE sensor) 208 is capable of acquiring output regarding subject brightness from output of many two-dimensionally arranged pixels, in order to observe the brightness of a subject. In this embodiment, the AE sensor observes a region of an outer frame (image pickup range) illustrated in FIG. 2. In the AE sensor, pixels for color filters R (red), G (green), and B (blue) are arranged in the stripe form separately for each color filter. In this embodiment, the brightness of a subject is observed in the AE sensor 208 and, at the same time, a process of tracking the subject is performed by using image data acquired by the AE sensor 208.

The camera body 201 also includes a focal-plane shutter 210 and an image pickup element 211 therein. When exposure is performed, the main mirror 203 and the sub mirror 204 are evacuated so as to be adjacent to the focusing screen 206 so that the flux of light is not to be blocked, and the focal-plane shutter 210 opens, whereby the image pickup element 211 is exposed to light. In order to avoid confusion, image capturing performed by the image pickup element 211 for the purpose of storage of image data is hereinafter referred to as "main image capturing", whereas image capturing performed by the AE sensor 208 is hereinafter referred to as "auxiliary image capturing". Also, image data generated through main image capturing is referred to as "main image data", whereas image data generated through auxiliary image capturing is referred to as "auxiliary image data". That is, the image pickup element 211 that generates main image data functions as a first image pickup element, whereas the AE sensor 208 that generates auxiliary image data functions as a second image pickup element.

In addition, a display unit 212 displays image capturing information and captured images, thereby allowing a user to check the content thereof.

Next, an electrical configuration of the image pickup apparatus according to this embodiment will be described.

Figure 3:
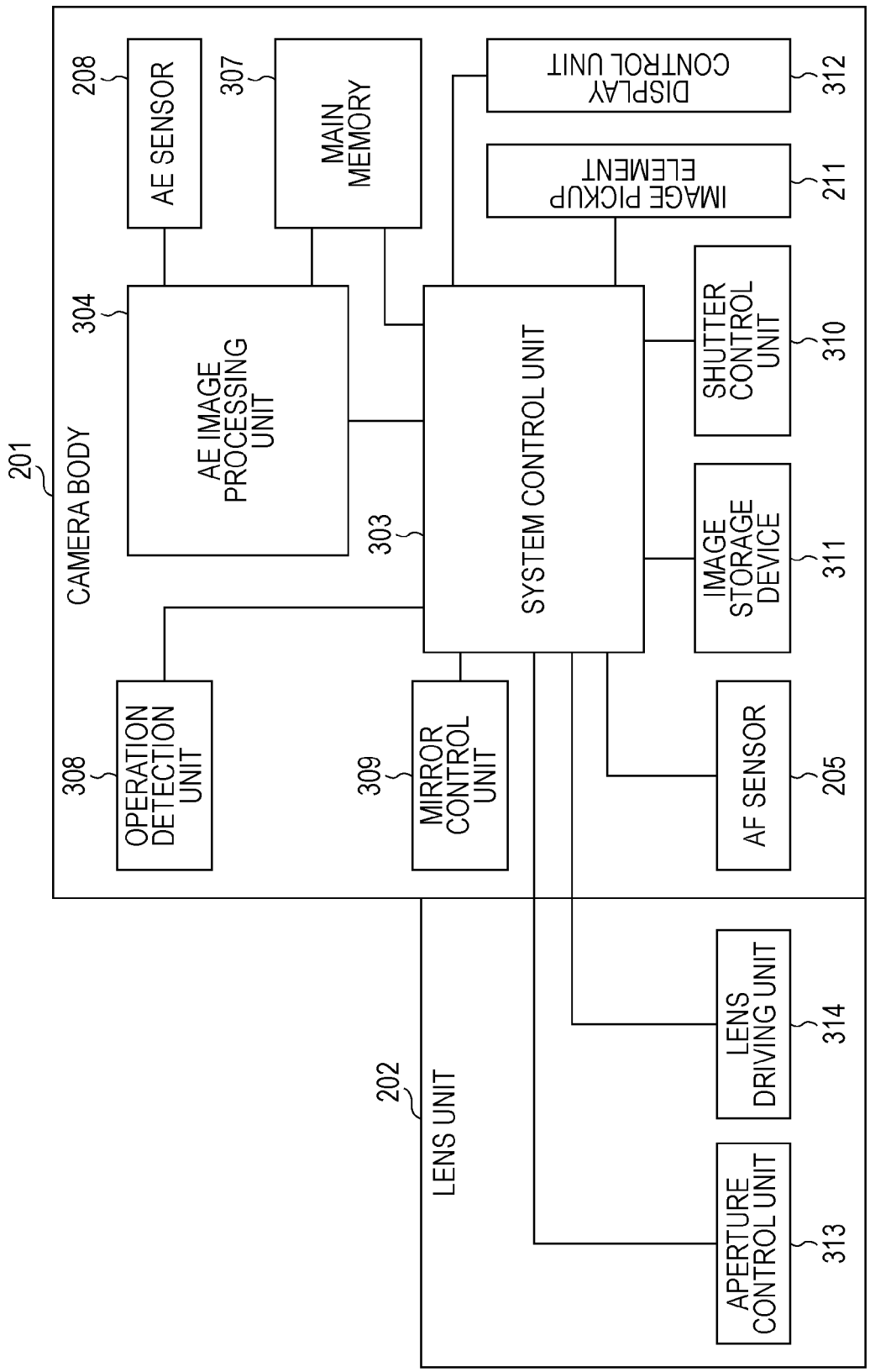
FIG. 3 is a schematic diagram illustrating an example of an electrical configuration of the image pickup apparatus according to the first embodiment.

FIG. 3 is a schematic diagram illustrating an example of an electrical configuration of the image pickup apparatus 200 according to the first embodiment. The same components as those in FIG. 1 are assigned the same references.

An operation detection unit 308 of FIG. 3 detects an operation performed by a user via a button, switch, or dial attached to the camera body 201, and sends a signal corresponding to the content of the operation to a system control unit 303. In particular, the operation detection unit 308 outputs an SW1 signal to the system control unit 303 once a release button is pressed halfway, and outputs an SW2 signal to the system control unit 303 once the release button is fully pressed. Here, a state in which the release button is kept being pressed halfway by a user is referred to as an "SW1 holding state", whereas a state in which the release button is kept being fully pressed is referred to as an "SW2 holding state". Additionally, the operation detection unit 308 outputs an SW1 cancellation signal to the system control unit 303 once the user stops pressing the release button in the SW1 holding state, and outputs an SW2 cancellation signal to the system control unit 303 once the user stops pressing the release button in the SW2 holding state.

A mirror control unit 309 controls movement of the main mirror 203 and the sub mirror 204 on the basis of a control signal sent from the system control unit 303.

Upon receipt of the SW1 signal from the operation detection unit 308 and in a mirror down state of a continuous shooting mode, the system control unit 303 reads out accumulated data from the line sensor corresponding to each focus detection point of the AF unit 205, selects a focus detection point on which focus adjustment is to be performed, and performs focus adjustment calculation. Then, the system control unit 303 sends a lens driving signal based on the calculation result to a lens driving unit 314.

The lens driving unit 314 moves the group of lenses 213 on the basis of the lens driving signal sent from the system control unit 303, thereby performing a focusing operation.

The image pickup element 211 converts light incoming through the group of lenses 213 into an electrical signal to generate image data, and outputs the image data to the system control unit 303. The system control unit 303 outputs the image data having been output from the image pickup element 211 to a display control unit 312, and also writes (stores) the image data in an image storage device 311.

The display control unit 312 displays an image based on the image data on a display, on the basis of the image data output from the system control unit 303.

A main memory 307 is a storage device for storing data needed in calculation performed by the system control unit 303 and an AE image processing unit 304.

The AE image processing unit 304 performs exposure adjustment calculation on the basis of the image data read out from the AE sensor 208, and outputs the calculation result to the system control unit 303. The system control unit 303 sends an aperture control signal to an aperture control unit 313 on the basis of the result of the exposure adjustment calculation output from the AE image processing unit 304. Also, the system control unit 303 sends a shutter control signal to a shutter control unit 310 at the time of releasing.

The aperture control unit 313 drives the aperture 214 on the basis of the aperture control signal received from the system control unit 303.

The shutter control unit 310 drives the focal-plane shutter 210 on the basis of the shutter control signal sent from the system control unit 303.

The AE image processing unit 304 also performs a subject tracking process in the continuous shooting mode and detects the position of a main subject in auxiliary image data read out from the AE sensor 208. Here, the aforementioned subject tracking process has two kinds of algorithms, which are a first subject tracking process and a second subject tracking process. A result of the first subject tracking process among these is output to the system control unit 303. A result of the second subject tracking process is recorded in the main memory 307. The two kinds of algorithms of the subject tracking processes will be described later.

The system control unit 303 selects one focus detection point from among the focus detection points of FIG. 2 on the basis of the result of the first subject tracking process output from the AE image processing unit 304. The system control unit 303 then sends a lens driving signal to the lens driving unit 314 on the basis of the result of the focus adjustment calculation regarding the selected focus detection point.

Next, an operation of the image pickup apparatus according to this embodiment when the continuous shooting mode is set will be described.

Figure 4:
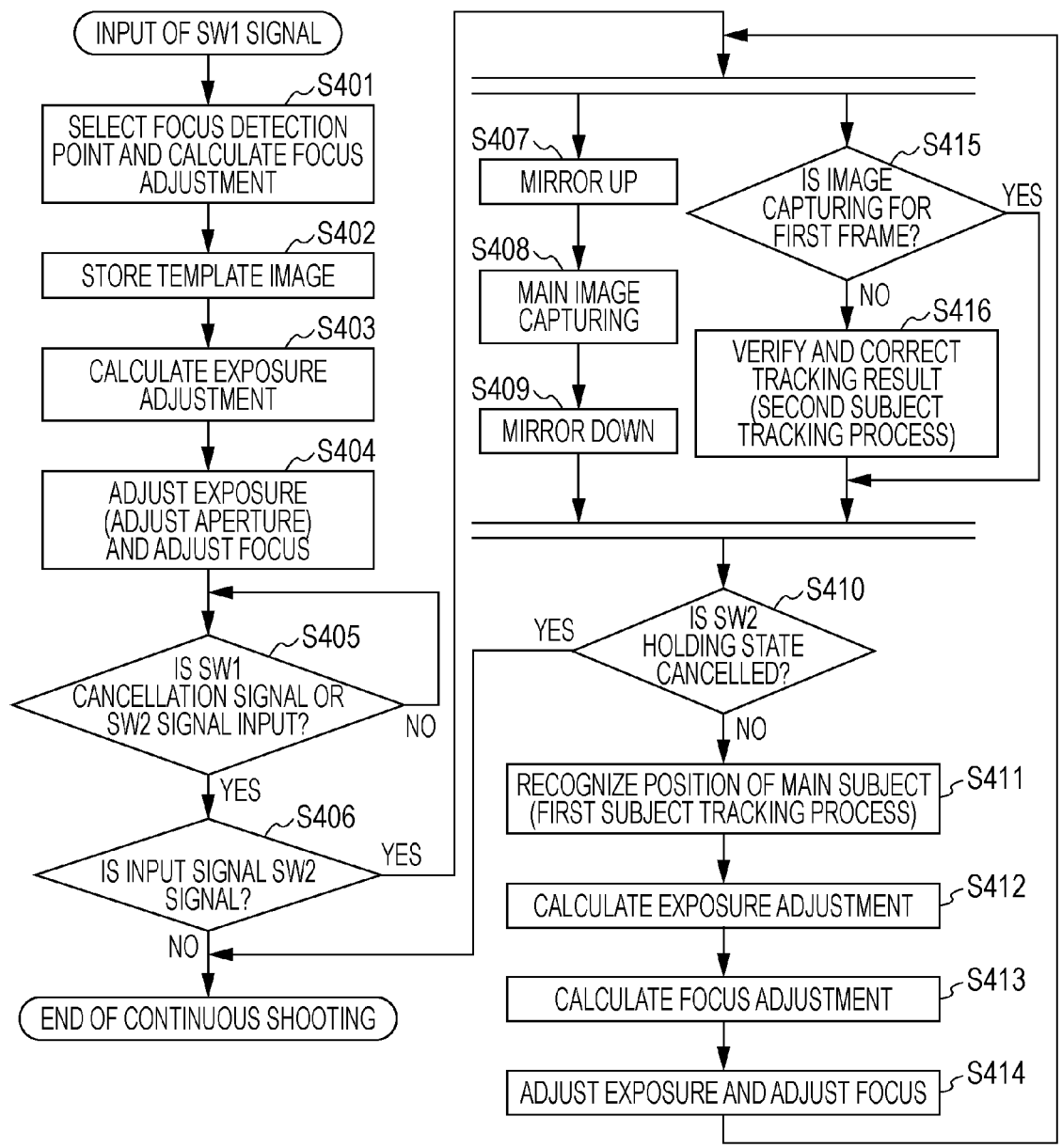
FIG. 4 is a flowchart illustrating an example of a procedure of a process performed by the image pickup apparatus according to the first embodiment in a continuous shooting mode.

FIG. 4 is a flowchart illustrating an example of a procedure of a process performed by the image pickup apparatus according to the first embodiment in the continuous shooting mode. The image pickup apparatus according to this embodiment captures still images of a plurality of frames in the continuous shooting mode.

Step S401 through step S405 are processing that is performed in the SW1 holding state, and correspond to a continuous-shooting preparation operation. Step S406 through step S416 are processing that is performed when the release button is fully pressed after the completion of the aforementioned continuous-shooting preparation operation and the state shifts into the SW2 holding state.

When a user presses the release button halfway and the SW1 signal is output to the system control unit 303 from the operation detection unit 308, the process of the flowchart of FIG. 4 is started. Each step will be described below.

First, in step S401, the system control unit 303 performs selection of a focus detection point and focus adjustment calculation on the basis of the output of the AF unit 205. For example, the system control unit 303 selects a focus detection point superposed on a subject that is considered to exist at a position near the image pickup apparatus 200.

Figure 5:
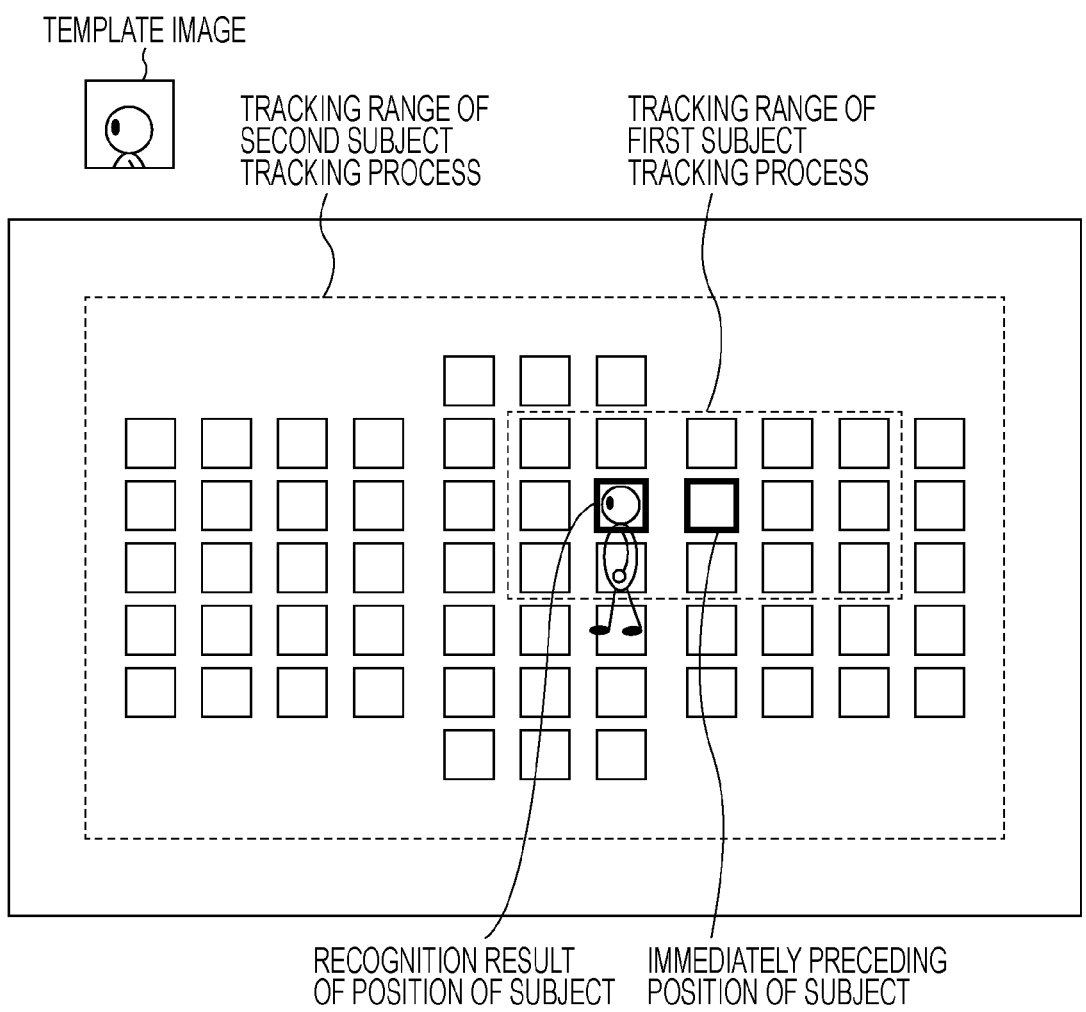
FIG. 5 is a diagram for explaining a tracking range according to the first embodiment.

Subsequently, in step S402, the AE image processing unit 304 reads out auxiliary image data from the AE sensor 208, and extracts a predetermined region in which the focus detection point selected in step S401 is located at the center. The AE image processing unit 304 (or the system control unit 303) records image data of the extracted region and the coordinates of the center of the extracted region within the auxiliary image data, in the main memory 307. These are used in the later-described tracking process. Hereinafter, the image data of the extracted region which is recorded in the main memory 307 is referred to as "template image data", whereas the coordinates of the center of the extracted region are referred to as "an immediately preceding position of a subject". Here, as illustrated in FIG. 5 to be described later, the template image data is related to a main subject. The AE image processing unit 304 that extracts this template image data constitutes a main subject determining unit configured to determine a main subject before continuous shooting is started.

Subsequently, in step S403, the AE image processing unit 304 performs exposure calculation by using the auxiliary image data read out from the AE sensor 208 in step S402, and outputs the result thereof to the system control unit 303.

Subsequently, in step S404, the system control unit 303 sends control signals to the aperture control unit 313 and the lens driving unit 314 on the basis of the result of the focus adjustment calculation performed in step S401 and the result of the exposure calculation performed in step S403. In this way, the aperture control unit 313 adjusts the aperture (exposure) on the basis of the control signal, and the lens driving unit 314 adjusts the focus on the basis of the control signal.

The next step S405 is a step in which the next operation of the user is waited for. Specifically, in step S405, the system control unit 303 waits until the user stops pressing the release button (SW1 is canceled) or performs an operation for fully pressing the release button (SW2 is input). When the system control unit 303 receives the SW1 cancellation signal or the SW2 signal from the operation detection unit 308, the process proceeds to step S406.

After the process proceeds to step S406, once the signal for canceling the waiting state of step S405 is input, the system control unit 303 determines whether or not the input signal is the SW2 signal. If the input signal is not the SW2 signal (is the SW1 cancellation signal) as a result of this determination, the continuous shooting process in the flowchart of FIG. 4 ends. On the other hand, if the input signal is the SW2 signal, the process proceeds to step S407, in which continuous shooting is started.

By the way, in the processing after the start of continuous shooting, step S407 through step S409 and step S415 through step S416 are performed in parallel. Accordingly, in this embodiment, the system control unit 303 handles step S407 through step S409 and the AE image processing unit 304 handles step S415 through step S416, thereby performing parallel processing.

Step S407 through step S409 are processing in which the system control unit 303 performs main image capturing.

First, in step S407, the system control unit 303 sends a control signal to the mirror control unit 309 to bring the main mirror 203 and the sub mirror 204 up and evacuate them from the optical path of main image capturing.

Subsequently, in step S408, the system control unit 303 sends a control signal to the shutter control unit 310 to perform releasing and expose the image pickup element 211 to light, thereby performing main image capturing. Then, the system control unit 303 reads image data generated by the image pickup element 211, and records (stores) this in the image storage device 311.

Subsequently, in step S409, the system control unit 303 sends a control signal to the mirror control unit 309 to bring the main mirror 203 and the sub mirror 204 down and positions them in the optical path of the main image capturing.

The processing of step S415 through step S416 will be described later.

Subsequently, in step S410, the system control unit 303 determines whether or not the SW2 holding state is canceled. If the SW2 cancellation signal has already been received and the SW2 holding state is cancelled as a result of this determination, the continuous shooting process of the flowchart of FIG. 4 ends. On the other hand, if the SW2 cancellation signal has not been received and the SW2 holding state is not cancelled, the process proceeds to step S411.

After the process proceeds to step S411, the AE image processing unit 304 performs detection of the position of the main subject in the first subject tracking process. At this time, the first subject tracking process is performed using a template matching method.

In step S411, the AE sensor 208 first performs accumulation of charges only for a period (first accumulation period) that is shorter than an accumulation period needed for performing appropriate exposure adjustment calculation. After the AE sensor 208 finishes accumulating charges, the AE image processing unit 304 reads out first auxiliary image data from the AE sensor 208, and also reads out template image data from the main memory 307. Then, the AE image processing unit 304 determines a correlation between these two pieces of image data, thereby detecting the position of the main subject in the first auxiliary image data. The AE image processing unit 304 then outputs the detection result to the system control unit 303. By setting the first accumulation period for acquiring the first auxiliary image data shorter than the accumulation period needed for performing appropriate exposure adjustment calculation, a timing at which the process of detecting the position of the main subject is started can be made earlier.

Here, in this embodiment, the AE sensor 208 constitutes an auxiliary image pickup unit configured to capture a plurality of pieces of auxiliary image data during an interval of main image capturing in the continuous shooting mode. Additionally, for example, the result of the detection of the position of the main subject obtained through the first subject tracking process is utilized in calculation of focus adjustment for the next main image capturing.

FIG. 5 is a diagram for explaining a tracking range according to the first embodiment.

Here, in the first subject tracking process, a region where matching is performed is limited to a range (tracking range of the first subject tracking process) that extends from the immediately preceding position of the subject read out from the main memory 307 by one focus detection point in each of the upward and downward directions and by two focus detection points in each of the leftward and rightward directions as illustrated in FIG. 5. That is, in the first subject tracking process, the position of the main subject is detected regarding a partial range of the auxiliary image data. Furthermore, matching is performed in a state where resolutions of the auxiliary image data and the template image data are converted into half the original resolutions. In this way, it is possible to perform matching at a high speed and to obtain the time for subsequent lens driving or the like.

Hereinafter, the first auxiliary image data read out from the AE sensor 208 in step S411 is referred to as "auxiliary image data 1". Also, the range where matching is performed is referred to as a "tracking range".

Subsequently, in step S412, the AE sensor 208 performs accumulation of charges only for a second accumulation period, which is determined by subtracting the first accumulation period from the accumulation period needed for performing appropriate exposure adjustment calculation. The AE image processing unit 304 reads out second auxiliary image data from the AE sensor 208, and newly generates a combined auxiliary image data obtained by performing addition of the second auxiliary image data and the auxiliary image data 1 having been read out from the AE sensor 208 in step S411. The AE image processing unit 304 performs exposure adjustment calculation by using the generated combined auxiliary image data, and outputs the result of the exposure adjustment calculation to the system control unit 303.

Hereinafter, the auxiliary image data read out from the AE sensor 208 in step S412 is referred to as "auxiliary image data 2", whereas the combined auxiliary image data of the auxiliary image data 1 and the auxiliary image data 2 is referred to as "auxiliary image data 12".

The sum of the accumulation periods in the AE sensor 208 for acquiring the auxiliary image data 1 and the auxiliary image data 2 is the accumulation period needed for performing appropriate exposure adjustment calculation. Accordingly, the AE image processing unit 304 can perform accurate exposure adjustment calculation by using this auxiliary image data 12. Furthermore, by combining the pieces of auxiliary image data, exposure calculation can be expected which is more stabilized as a result of a decrease in noise and an increase in an amount of light, than a case of using uncombined image data.

Subsequently, in step S413, the system control unit 303 performs focus adjustment calculation on the focus detection point for the position of the subject detected in step S411.

Subsequently, in step S414, the system control unit 303 sends control signals to the aperture control unit 313 and the lens driving unit 314 to perform exposure adjustment and focus adjustment on the basis of the results of the calculations performed in step S412 and step S413.

After finishing step S414, the process enters a release operation. The system control unit 303 performs the processing of step S407 through step S409, whereas the AE image processing unit 304 performs the processing of step S415 through step S416.

In step S415, the AE image processing unit 304 determines whether or not image capturing is for the first frame. If the image capturing is not for the first frame as a result of this determination (image capturing is for the second or following frame), the process proceeds to step S416.

After the process proceeds to step S416, the AE image processing unit 304 performs detection of the position of the main subject in the second subject tracking process, and performs verification and correction on the result of the first subject tracking process that was performed immediately before (on the immediately preceding frame). As in the first subject tracking process, this second subject tracking process is performed using the template matching method. The AE image processing unit 304 determines a correlation between the auxiliary image data 2 read out in step S412 and the template image data recorded in the main memory 307, thereby detecting the position of the main subject. However, unlike the first subject tracking process, in the second subject tracking process, the range where matching is performed (tracking range of the second subject tracking process) is set to the entire auxiliary image data 2 and matching is performed without changing the resolution as illustrated in FIG. 5. In this way, a tracking result for a wider range which has a higher accuracy than the result of the first subject tracking process can be obtained.

By utilizing this tracking result, verification and correction are performed on the result of the first subject tracking that was performed immediately before in step S411. Here, the following three points are verified.

Firstly, since the tracking range is limited in the first subject tracking process, the correct result is not obtained when the main subject moves fast to be outside the tracking range. Accordingly, a search is performed on the entire auxiliary image data 2 in the second subject tracking process to check whether or not the main subject exists outside the range of the first subject tracking process.

Secondly, when there is a subject that is similar to the main subject in the tracking range, these subjects may not be discriminated and the subject to be tracked may be mistaken since the resolution of image data is decreased in the first subject tracking process. Accordingly, by performing the second subject tracking process by using the auxiliary image data 2 whose resolution is not decreased, the main subject and the similar subject are discriminated and whether or not the result of the first subject tracking process is correct is verified.

Thirdly, since the resolution of the image data used in the first subject tracking process is converted into half the original resolution, the detected position of the subject is coarse and there may be a difference between the detected position and the correct position of the subject. Accordingly, by performing the second subject tracking process in which the resolution is higher, the position of the subject is detected more accurately.

If different results are obtained from the first subject tracking process and the second subject tracking process in the verification regarding the foregoing three points, the information on the immediately preceding position of the subject recorded in the main memory 307 is corrected to the result of the second subject tracking process.

Additionally, when the possibility that the subject detected in the first subject tracking process and the subject detected in the second subject tracking process are the same is high and when there is a difference between the positions of these subjects which is equal to or greater than a predetermined threshold, movement of the subject may be predicted on the basis of the change in the position of the subject.

Meanwhile, if it is determined in step S415 that image capturing is for the first frame, or if step S416 ends, the process proceeds to step S410 once step S407 through step S409 end, and then the following processing is performed.

Figure 6:
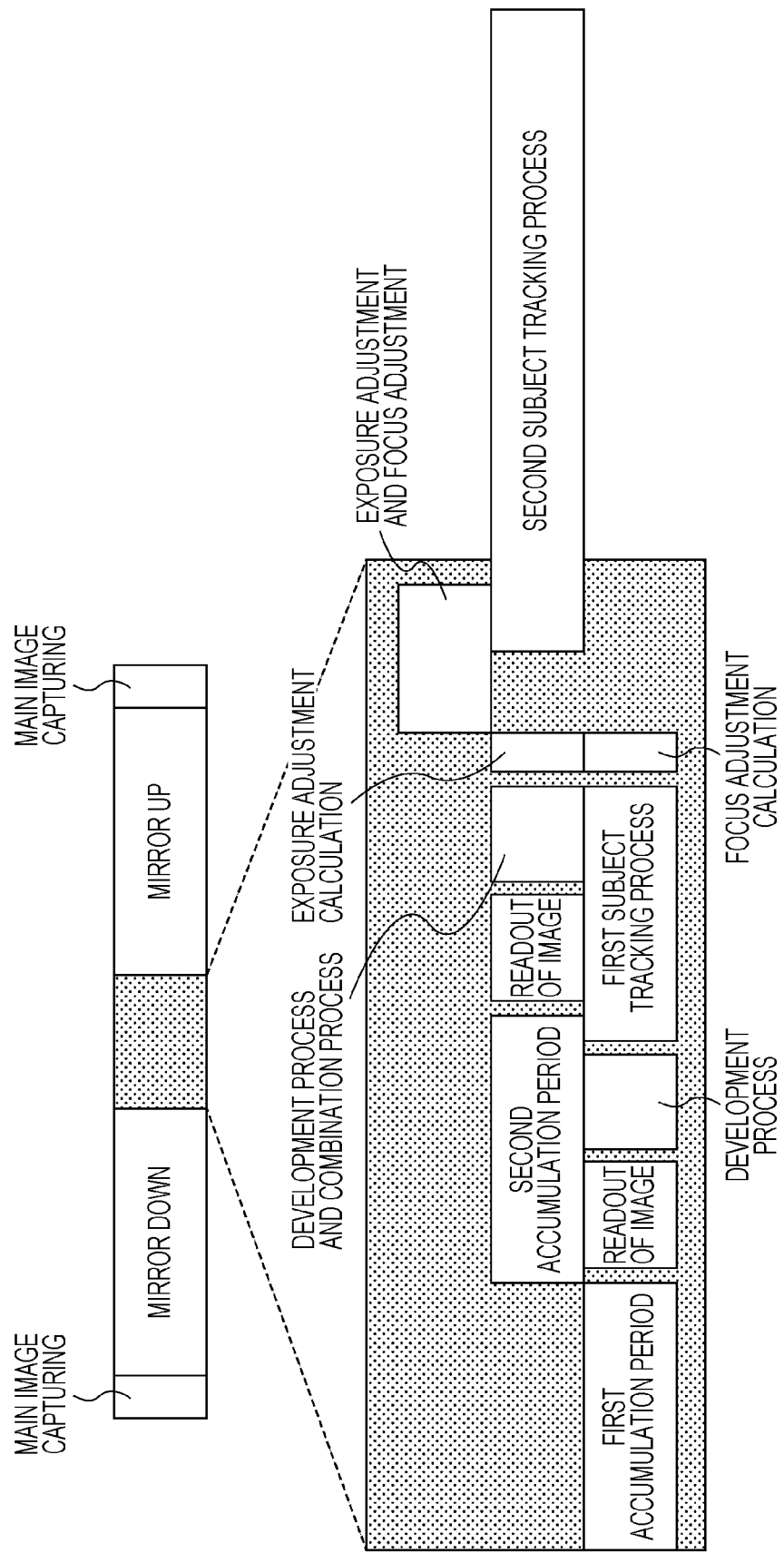
FIG. 6 is a diagram for explaining timings at which individual processes according to the first embodiment are performed.

FIG. 6 is a diagram for explaining timings at which individual processes are performed in this embodiment.

After main image capturing is performed and then the main mirror 203 and the sub mirror 204 are brought down, the AE image processing unit 304 causes the AE sensor 208 to perform accumulation of charges only for the first accumulation period, and reads out the auxiliary image data 1. Since the accumulation period for this auxiliary image data 1 is set short, the brightness is insufficient to perform exposure adjustment calculation.

Subsequently, the AE image processing unit 304 performs a development process on the read out auxiliary image data 1, and performs the first subject tracking process by using the auxiliary image data 1 having undergone the development process. The result of the first subject tracking process is then output to the system control unit 303. On the basis of this result, the system control unit 303 selects a new focus detection point. Then, the system control unit 303 calculates the focus adjustment state of the image-capturing lens unit 202 at the newly selected focus detection point, from the output of the focus detection line sensor sent from the AF unit 205, and generates a control signal for driving the group of lenses 213.

After causing the AE sensor 208 to perform accumulation of charges only for the first accumulation period, the AE image processing unit 304 causes the AE sensor 208 to perform accumulation of charges only for the second accumulation period and reads out the auxiliary image data 2. Since the accumulation period is also set short for this auxiliary image data 2, the brightness is insufficient to perform exposure adjustment calculation.

Subsequently, the AE image processing unit 304 performs the development process on the read out auxiliary image data 2, and combines the auxiliary image data 1 and the auxiliary image data 2 that have been undergone the development process. By combining the auxiliary image data 1 and the auxiliary image data 2, the auxiliary image data 12 can be obtained that has the brightness necessary for performing appropriate exposure adjustment calculation. The AE image processing unit 304 performs exposure adjustment calculation by using this auxiliary image data 12, and outputs the calculation result to the system control unit 303.

The system control unit 303 sends control signals to the aperture control unit 313 and the lens driving unit 314 on the basis of the results of the focus adjustment calculation and the exposure adjustment calculation so as to perform exposure adjustment and focus adjustment. After finishing these exposure adjustment and focus adjustment, the system control unit 303 brings the main mirror 203 and the sub mirror 204 up and performs main image capturing.

In addition, the AE image processing unit 304 performs the second subject tracking process, accuracy of which is higher than that of the first subject tracking process, by using the auxiliary image data 2. Since this second subject tracking process requires the time that is longer than that of the first subject tracking process and the timing at which the process is started is later than the timing of the first subject tracking process, the result of the second subject tracking process is unable to be reflected in the immediately following main image capturing. Furthermore, while the second subject tracking process is continued by the AE image processing unit 304, the next main image capturing is started.

Instead, by performing the subject tracking process having a high accuracy, the "tracking range" for the first subject tracking process to be performed subsequently can be correctly set. Accordingly, the second subject tracking process can contribute to enhancement of the accuracy of the first subject tracking process to be performed subsequently.

In this embodiment, since the first piece of the plurality of pieces of auxiliary image data is read out in a relatively early stage as described above, the processing time of the subject tracking process can be obtained. This auxiliary image data 1 and the auxiliary image data 2 obtained later are combined, and the resulting auxiliary image data 12 is used in exposure adjustment calculation, processing time of which is relatively short. In this manner, it is possible to obtain the time for the subject tracking process and to perform exposure adjustment calculation by using image data for which the appropriate accumulation period is obtained.

Furthermore, by performing the detailed subject tracking process by using the auxiliary image data 2 in parallel to the main image capturing process, it is possible to perform correction on the position of the subject and to correctly set the tracking range of the next subject tracking process. In the aforementioned method, the accuracy of subject tracking can be enhanced by performing verification and correction on the result of the first subject tracking process, compared with a case in which the subject tracking process is performed only once for one frame. Although the second subject tracking process is started before the mirror up operation in FIG. 6, the second subject tracking process may be started after the mirror up operation. The timing at which the second subject tracking process is started can be set arbitrary as long as the second subject tracking process is completed before the subsequent first subject tracking process is performed.

While the preferred embodiment of the present invention has been described above, the present invention is not limited to this embodiment, and various modifications and alterations can be made within the scope of the gist thereof. For example, regarding the method for detecting the position of the subject, not only template-matching-based subject tracking but also tracking using color information and a result of face detection may be used. In addition, moving object analysis using the optical flow and an edge-detection-based scene detection technology may be used. Although only one piece of image data that is stored first is used as the template for use in template matching in this embodiment, a region of the main subject may be extracted from image data newly captured during continuous shooting and the extracted region may be set as a new template. Here, the first and second subject tracking processes only have to take the algorithm configurations such that the processes are for tracking the same subject by analyzing an auxiliary image, the first subject tracking process has a relatively low accuracy but operates at a high speed, and the second subject tracking process performs tracking at a low speed but at a high accuracy.

Additionally, the auxiliary image data 2 generated in step S412 is used as the image data that is used in determining the correlation with the template image data in the second subject tracking process in step S416 of FIG. 4. However, the present invention is not necessarily limited to this configuration. For example, as long as the image data is one piece of auxiliary image data among the plurality of captured auxiliary image data, the image data can be used in the present invention. For example, the correlation with the template image data may be determined by using one piece or a plurality of pieces of the second or following pieces of image data. Alternatively, the second subject tracking process may be performed by using the auxiliary image data 12 obtained by combining the auxiliary image data 1 and the auxiliary image data 2, instead of using the auxiliary image data 2.

Moreover, although the focus detection point is selected which is superposed on the subject that is considered to exist at the position near the image pickup apparatus 200 in the processing of step S401 of FIG. 4, a given focus detection point may be selected in accordance with an instruction of a user. If the AE image processing unit 304 has a face detection function of detecting a human face from image data read out from the AE sensor 208, this face may be selected as the subject and image data of a region surrounding the detected face may be used as the template image data.

Second Embodiment

Next, an image pickup apparatus according to a second embodiment will be described with reference to FIG. 7 through FIG. 12.

Figure 7:
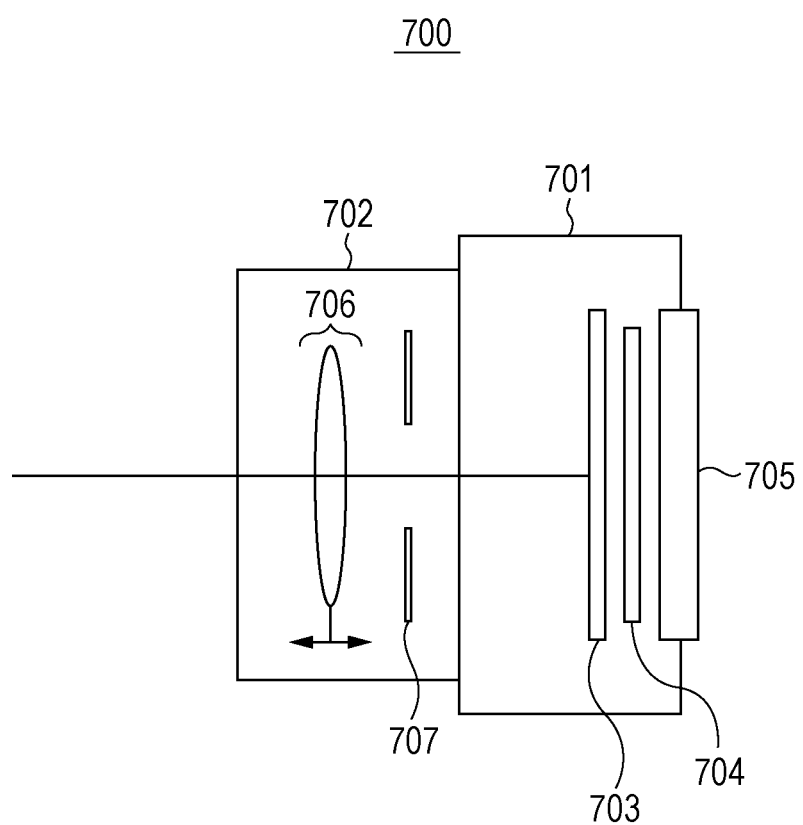
FIG. 7 is a schematic diagram illustrating an example of a mechanical configuration of an image pickup apparatus according to a second embodiment.

FIG. 7 is a schematic diagram illustrating an example of a mechanical configuration of a mirrorless digital single-lens reflex camera, which is the image pickup apparatus according to the second embodiment.

In an image pickup apparatus 700 of FIG. 7, an image-capturing lens unit 702 is attached to a front face of a camera body 701. In the camera body 701, the image-capturing lens unit 702 to be attached is interchangeable with another image-capturing lens unit. This camera body 701 and the image-capturing lens unit 702 perform communication via mount contact points, not illustrated. The image-capturing lens unit 702 includes a group of lenses 706 and an aperture 707 therein. The camera body 701 is capable of adjusting an amount of light taken into the camera by adjusting an open diameter of the aperture 707 and of adjusting a focal position by adjusting the position of the group of lenses 706, through communication-based control via the mount contact points.

The camera body 701 includes a focal-plane shutter 703 and an image pickup element 704 therein. When exposure is performed, the focal-plane shutter 703 opens, whereby the image pickup element 704 is exposed to light. The image pickup element 704 has pixels for image generation and pixels for phase-difference detection. Here, the pixels for image generation are pixels for generating image data during exposure, whereas the pixels for phase-difference detection are pixels for detecting a phase difference and performing focus adjustment.

A structure of a pixel for performing focus adjustment of this image pickup element 704 will be described.

Figure 8A:
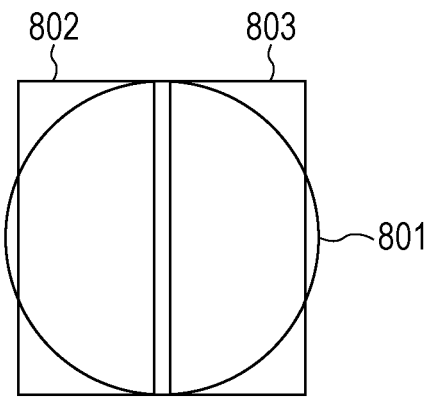
FIGS. 8A and 8B are diagrams illustrating a configuration of a pixel for phase-difference detection of an image pickup element according to the second embodiment.
Figure 8B:
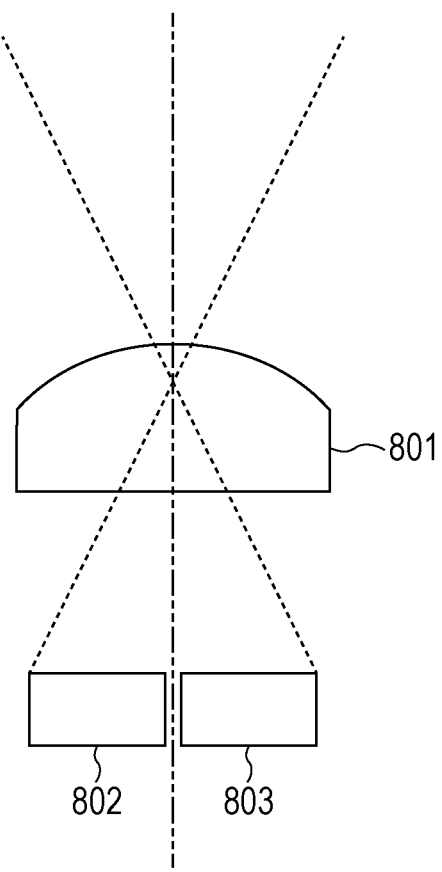

FIG. 8A illustrates an elevational view of the pixel of the image pickup element 704, whereas FIG. 8B illustrates a sectional view of the pixel. In FIGS. 8A and 8B, 801 represents a microlens, and 802 and 803 each represent a photodiode. Image data is read out by using two photodiodes for one microlens, whereby pupil segmentation is performed on the left and right sides of the drawing. By comparing an image formed by collecting the output of this left pixel with an image formed by collecting the output of the right pixel, a focus adjustment state of the image-capturing lens unit 702 can be detected on the basis of the phase-difference detection method, as in the focus detection line sensor of the AF unit.

Figure 9:
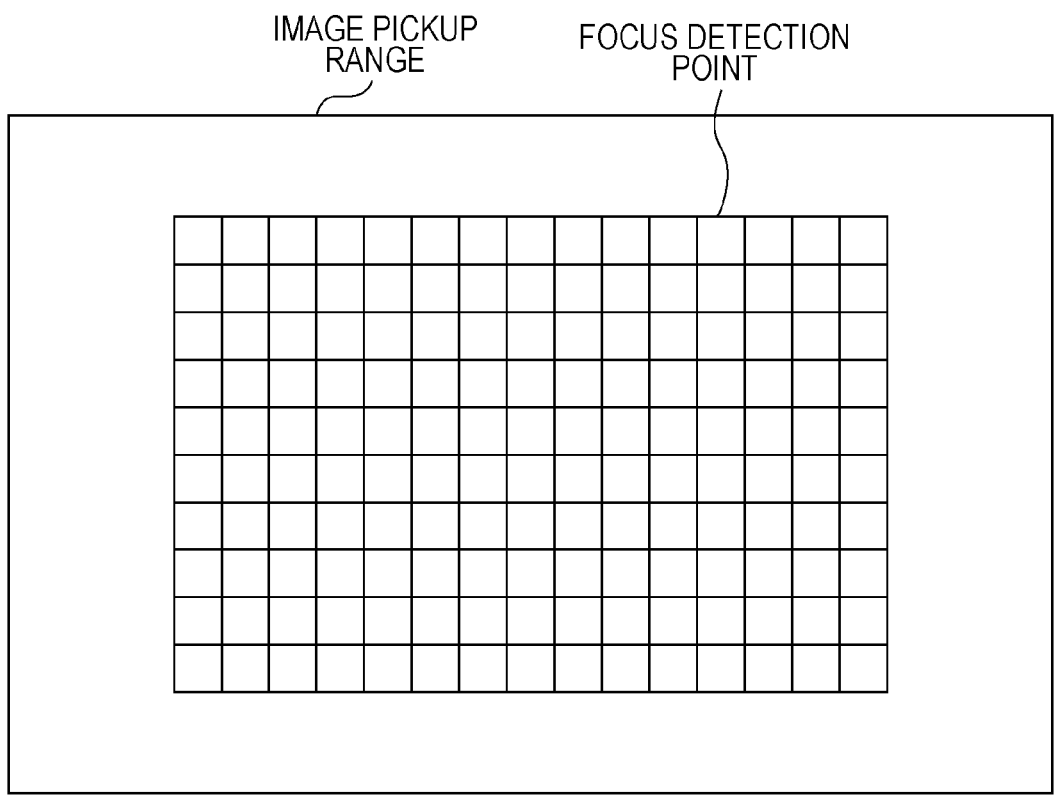
FIG. 9 is a schematic diagram illustrating a layout of focus detection points of the image pickup apparatus according to the second embodiment.

FIG. 9 is a schematic diagram illustrating a layout of focus detection points of the image pickup apparatus (in the image pickup element 704) according to the second embodiment. Focus adjustment is performed by using the output of the pixels for phase-difference detection that correspond to grid-like regions for focus detection points.

A display unit 705 of FIG. 7 displays image capturing information and captured images, thereby allowing a user to check the content thereof.

Next, an electrical configuration of the image pickup apparatus according to this embodiment will be described.

Figure 10:
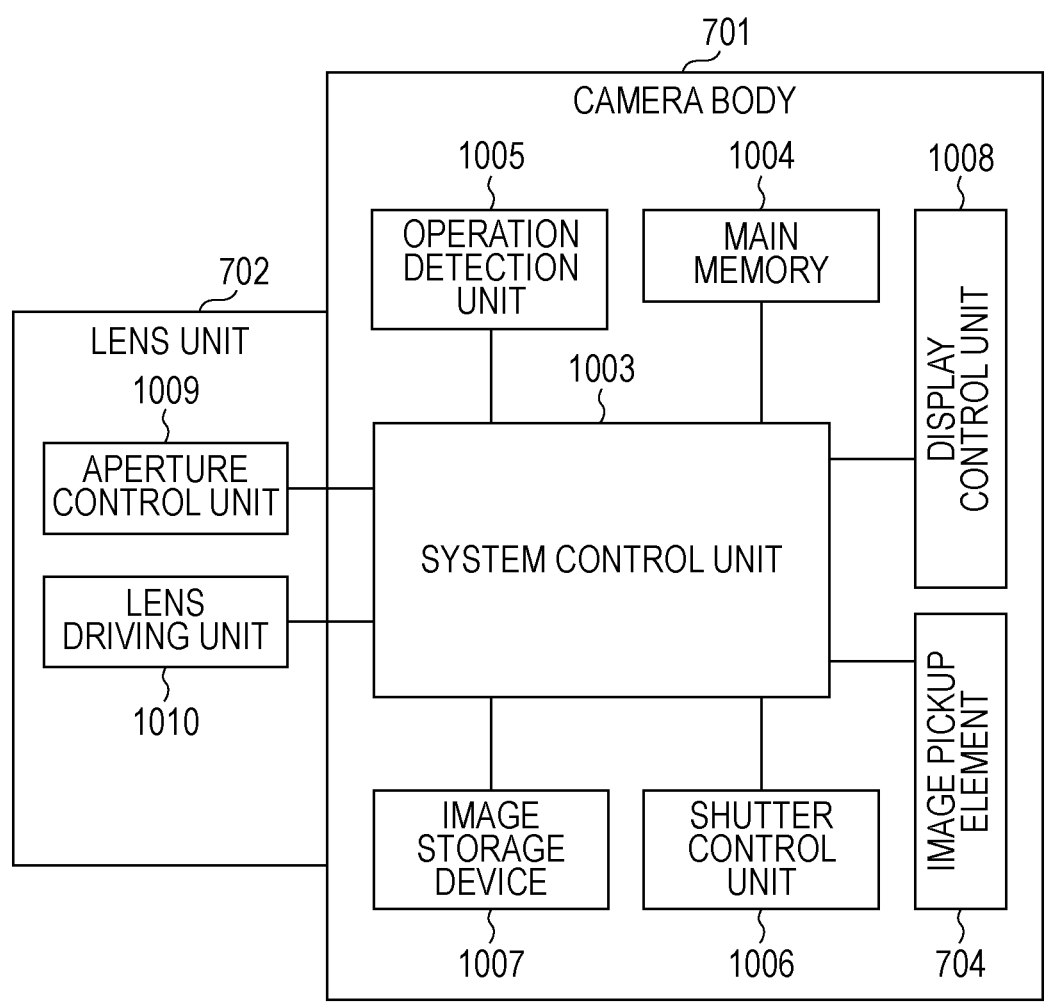
FIG. 10 is a schematic diagram illustrating an example of an electrical configuration of the image pickup apparatus according to the second embodiment.

FIG. 10 is a schematic diagram illustrating an example of the electrical configuration of the image pickup apparatus according to the second embodiment. The same components as those in FIG. 7 are assigned the same references.

An operation detection unit 1005 of FIG. 10 detects an operation performed by a user via a button, switch, or dial attached to the camera body 701, and sends a signal corresponding to the content of the operation to a system control unit 1003. In particular, the operation detection unit 1005 outputs an SW1 signal to the system control unit 1003 once a release button is pressed halfway, and outputs an SW2 signal to the system control unit 1003 once the release button is fully pressed. Additionally, the operation detection unit 1005 outputs an SW1 cancellation signal to the system control unit 1003 once the user stops pressing the release button in the SW1 holding state, and outputs an SW2 cancellation signal to the system control unit 1003 once the user stops pressing the release button in the SW2 holding state.

The system control unit 1003 reads out a movie generated by the image pickup element 704, and outputs the movie to a display control unit 1008. This is for performing so-called live view display. The display control unit 1008 displays images based on the received movie on the display unit 705.

Upon receipt of the SW1 signal from the operation detection unit 1005, the system control unit 1003 reads out phase-difference information from the pixels for phase-difference detection of the image pickup element 704, and performs focus adjustment calculation. The system control unit 1003 having completed this focus adjustment calculation sends a lens driving signal based on the result of the focus adjustment calculation to a lens driving unit 1010.

The lens driving unit 1010 moves the group of lenses 706 on the basis of the lens driving signal received from the system control unit 1003, thereby performing a focusing operation.

The image pickup element 704 converts light incoming through the image-capturing lens unit 702 into an electrical signal to generate image data, and outputs the image data to the system control unit 1003. The system control unit 1003 outputs the image data having been output from the pixels for image generation of the image pickup element 704 to the display control unit 1008, and also writes (stores) the image data in an image storage device 1007 at the time of main image capturing.

The display control unit 1008 displays an image based on the image data on the display unit 705, on the basis of the image data output from the system control unit 1003. Here, image capturing for acquiring image data to be recorded in the image storage device 1007 for the purpose of storage in response to the SW2 signal, among the pieces of image data output from the image pickup element 704, is referred to as "main image capturing". Images that are not to be recorded in the image storage device 1007 and are for live view display are referred to as "auxiliary images".

A main memory 1004 is a storage device for storing data needed in calculation performed by the system control unit 1003.

An aperture control unit 1009 drives the aperture 707 on the basis of the aperture control signal received from the system control unit 1003.

A shutter control unit 1006 drives the focal-plane shutter 703 on the basis of the shutter control signal sent from the system control unit 1003.

Also, the system control unit 1003 performs a subject tracking process in the continuous shooting mode and detects the position of a main subject from image data read out from the image pickup element 704. Here, the aforementioned subject tracking process has two kinds of algorithms, which are a first subject tracking process and a second subject tracking process. These two kinds of the subject tracking processes are performed by using algorithms that are the same as those of the first embodiment.

The system control unit 1003 selects one focus detection point from among the focus detection points illustrated FIG. 9 on the basis of the result of the first subject tracking process. The system control unit 1003 then sends a lens driving signal to the lens driving unit 1010 on the basis of the result of the focus adjustment calculation regarding the selected focus detection point.

Next, an operation of the image pickup apparatus according to this embodiment in the continuous shooting mode will be described.

Figure 11:
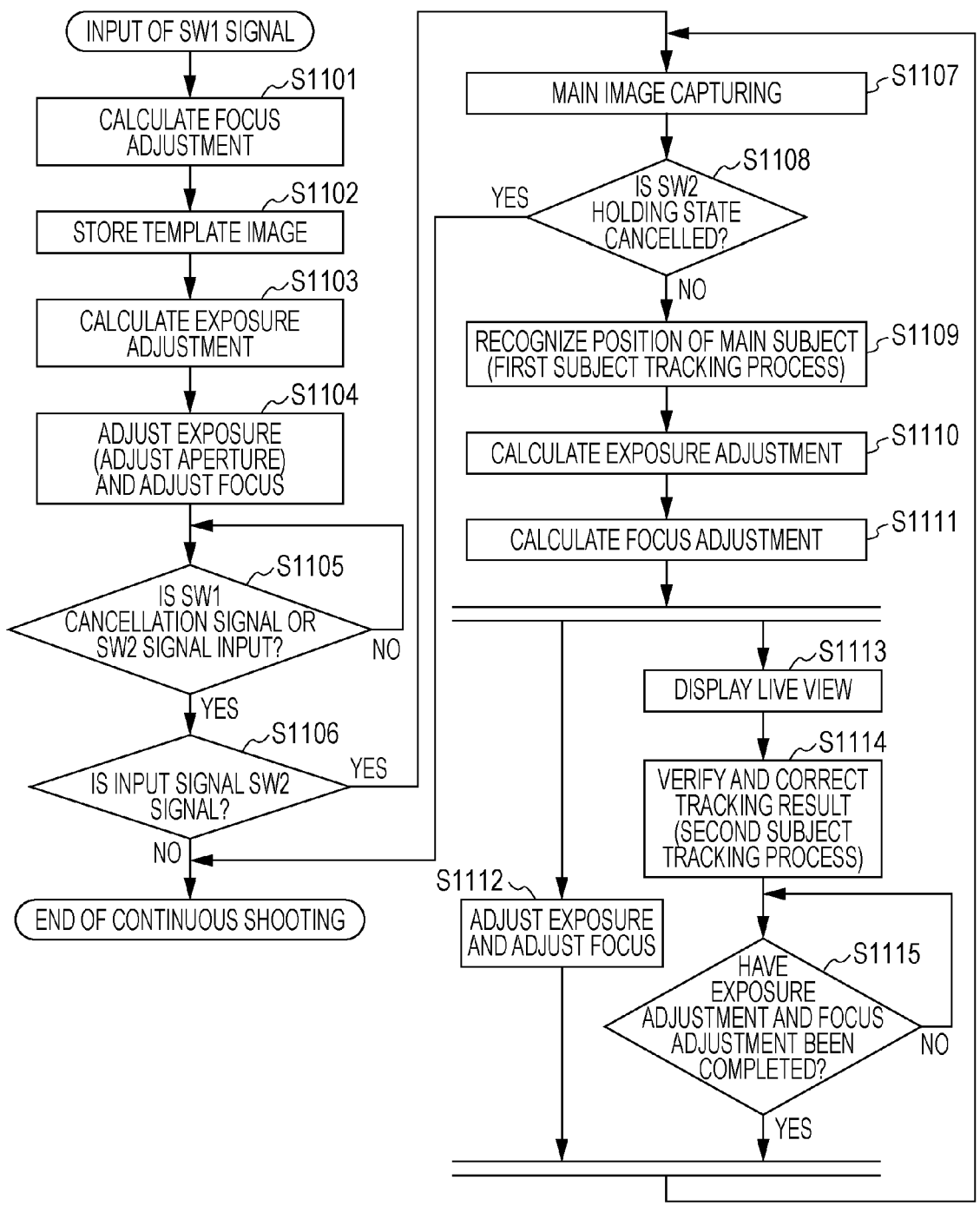
FIG. 11 is a flowchart illustrating an example of a procedure of a process performed by the image pickup apparatus according to the second embodiment in a continuous shooting mode.

FIG. 11 is a flowchart illustrating an example of a procedure of a process of the image pickup apparatus according to the second embodiment in the continuous shooting mode. The image pickup apparatus according to this embodiment captures still images of a plurality of frames in the continuous shooting mode.

Step S1101 through step S1105 are processing that is performed in the SW1 holding state, and correspond to a continuous-shooting preparation operation. Step S1106 through step S1115 are processing that is performed when the release button is fully pressed after the completion of the aforementioned continuous-shooting preparation operation and the state shifts into the SW2 holding state.

When a user presses the release button halfway and the SW1 signal is output to the system control unit 1003 from the operation detection unit 1005, the process of the flowchart of FIG. 11 is started. Each step will be described below. It is assumed that live view display is started before this flowchart of FIG. 11 starts.

First, in step S1101, the system control unit 1003 performs focus adjustment calculation on the basis of the output of the pixels for phase-difference detection of the image pickup element 704. For example, the system control unit 1003 selects a focus detection point superposed on a subject that is considered to exist at a position near the image pickup apparatus 700.

Figure 12:
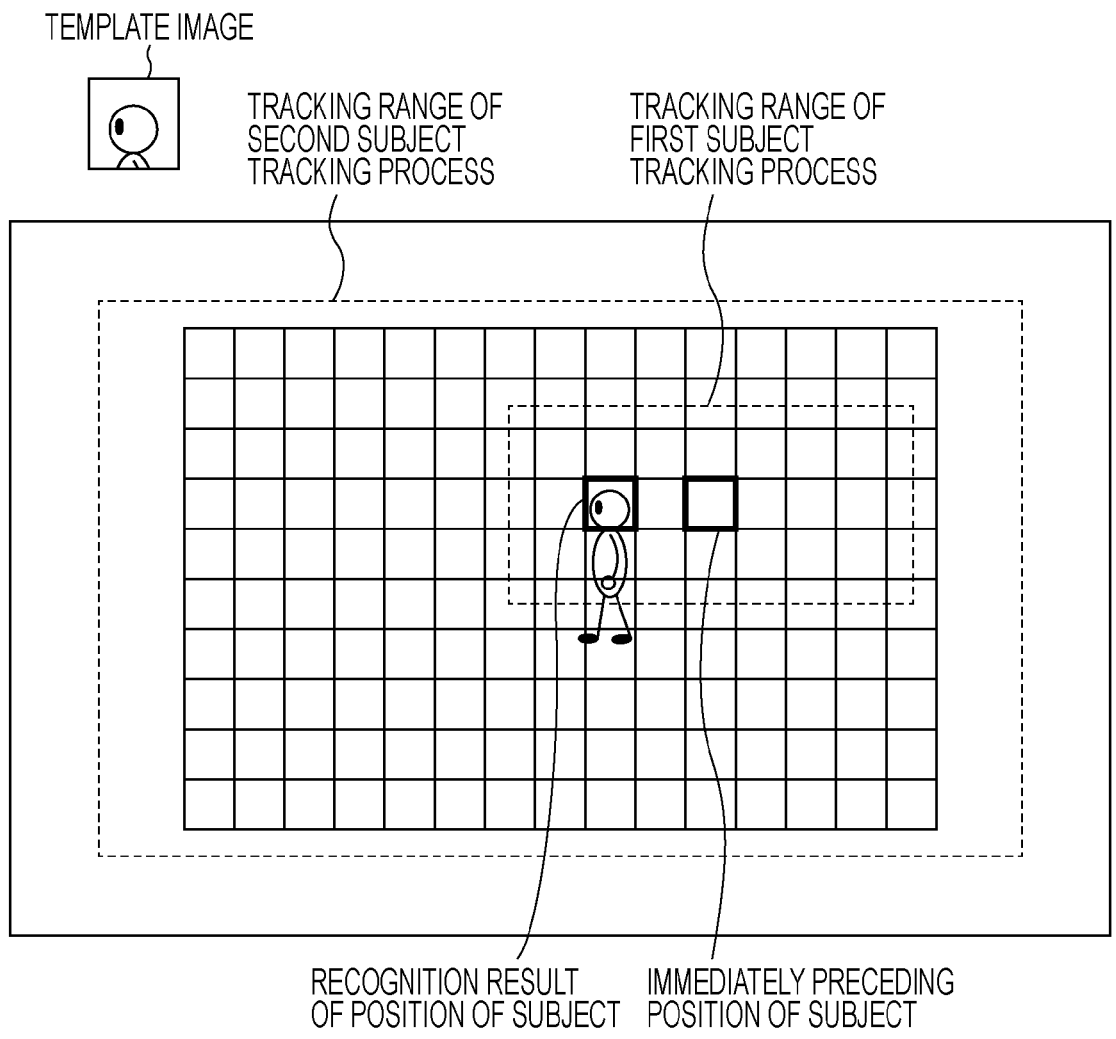
FIG. 12 is a diagram for explaining a tracking range according to the second embodiment.

Subsequently, in step S1102, the system control unit 1003 reads out image data from the pixels for image generation of the image pickup element 704, and extracts a predetermined region in which the focus detection point selected in step S1101 is located at the center. The system control unit 1003 then records image data of the extracted region and the coordinates of the center of the extracted region within the image data, in the main memory 1004. These are used in the later-described tracking process. Hereinafter, the image data of the extracted region which is recorded in the main memory 1004 is referred to as "template image data", whereas the coordinates of the center of the extracted region are referred to as "an immediately preceding position of a subject". Here, as illustrated in FIG. 12 to be described later, the template image data is related to a main subject. The system control unit 1003 that extracts this template image constitutes a main subject determining unit configured to determine a main subject before continuous shooting is started.

Subsequently, in step S1103, the system control unit 1003 performs exposure calculation by using the image data that has been read out in step S1102.

Subsequently, in step S1104, the system control unit 1003 sends control signals to the aperture control unit 1009 and the lens driving unit 1010 on the basis of the result of the focus adjustment calculation performed in step S1101 and the result of the exposure calculation performed in step S1103. In this way, the aperture control unit 1009 adjusts the aperture (exposure) on the basis of the control signal, and the lens driving unit 1010 adjusts the focus on the basis of the control signal.

In step S1105, the system control unit 1003 waits until the user stops pressing the release button (SW1 is canceled) or performs an operation for fully pressing the release button (SW2 is input). When the system control unit 1003 receives the SW1 cancellation signal or the SW2 signal from the operation detection unit 1005 (when the SW1 holding state is canceled), the process proceeds to step S1106.

After the process proceeds to step S1106, once the signal for canceling the waiting state of step S1105 is input, the system control unit 1003 determines whether or not the input signal is the SW2 signal. If the input signal is not the SW2 signal (is the SW1 cancellation signal) as a result of this determination, the continuous shooting process in the flowchart of FIG. 11 ends. On the other hand, if the input signal is the SW2 signal, the process proceeds to step S1107, in which live view display is terminated and continuous shooting is started.

After the process proceeds to step S1107, in which the system control unit 1003 terminates live view display and sends a control signal to the shutter control unit 1006 to perform releasing and expose the image pickup element 704 to light, thereby performing main image capturing. Then, the system control unit 1003 reads image data generated by the image pickup element 704, and records (stores) this in the image storage device 1007.

Subsequently, in step S1108, the system control unit 1003 determines whether or not the SW2 holding state is canceled. If the SW2 cancellation signal has already been received and the SW2 holding state is cancelled as a result of this determination, the continuous shooting process of the flowchart of FIG. 11 ends. On the other hand, if the SW2 cancellation signal has not been received and the SW2 holding state is not cancelled, the process proceeds to step S1109.

In step S1109, the image pickup element 704 first performs accumulation of charges only for a period (first accumulation period) that is shorter than an accumulation period needed for performing appropriate exposure adjustment calculation. After the image pickup element 704 finishes accumulating charges, the system control unit 1003 reads out first auxiliary image data (auxiliary image data 1) from the pixels for image generation of the image pickup element 704, and also reads out the template image data from the main memory 1004. Then, the system control unit 1003 determines a correlation between these two pieces of image data, thereby detecting the position of the main subject in the auxiliary image data 1. As described above, regarding the tracking algorithms, the same algorithms as those of the first embodiment are used. In this embodiment, the image pickup element 704 constitutes an auxiliary image pickup unit configured to capture a plurality of pieces of auxiliary image data during an interval of main image capturing in the continuous shooting mode.

FIG. 12 is a diagram for explaining a tracking range in the second embodiment.

In the first subject tracking process according to this embodiment, a region where matching is performed is set to a range (tracking range of the first subject tracking process) that extends from the immediately preceding position of the subject by one focus detection point in each of the upward and downward directions and by three focus detection points in each of the leftward and rightward directions as illustrated in FIG. 12.

Subsequently, in step S1110, the image pickup element 704 performs accumulation of charges only for a second accumulation period, which is determined by subtracting the first accumulation period from the accumulation period needed for performing appropriate exposure adjustment calculation. The system control unit 1003 reads out second auxiliary image data (auxiliary image data 2) from the image pickup element 704, and newly generates combined auxiliary image data obtained by performing addition of the auxiliary image data 2 and the auxiliary image data 1 having been read out from the image pickup element 704 in step S1109. The system control unit 1003 performs exposure adjustment calculation by using this combined auxiliary image data.

Subsequently, in step S1111, the system control unit 1003 performs focus adjustment calculation by using the output from the pixel for phase-difference detection that corresponds to the position of the subject detected in step S1109.

Subsequently, in step S1112, the system control unit 1003 sends control signals to the aperture control unit 1009 and the lens driving unit 1010 to perform exposure adjustment and focus adjustment on the basis of the results of the calculations performed in step S1110 and step S1111.

While the lens driving unit 1010 is moving the group of lenses 706 in step S1112, the system control unit 1003 performs live view display and the second subject tracking process in step S1113 through step S1115.

First, in step S1113, the system control unit 1003 restarts live view display. The image pickup element 704 continues live view display by using the combined auxiliary image data only for the first frame and by using image data acquired in one accumulation for the second and following frames as usual. This live view is continued until main image capturing is performed again.

Subsequently, in step S1114, the system control unit 1003 sets the entire combined auxiliary image data acquired in step S1110 as the tracking range, and starts detection of the position of the main subject in the second subject tracking process. Specifically, the system control unit 1003 determines a correlation between the combined auxiliary image data generated in step S1110 and the template image data recorded in the main memory 1004, thereby detecting the position of the main subject. This second subject tracking process uses the same algorithm as that of the first embodiment.

Upon the second subject tracking process being started in step S1114, the system control unit 1003 determines whether or not exposure adjustment and focus adjustment in step S1112 have been completed in step S1115. If exposure adjustment and focus adjustment in step S1112 have not been completed as a result of this determination, the system control unit 1003 waits. If exposure adjustment and focus adjustment have been completed, the system control unit 1003 terminates live view display and the process returns to step S1107. Here, if it is determined in step S1115 that exposure adjustment and focus adjustment have been completed, the process returns to step S1107 even if the second subject tracking process has not been completed. This second subject tracking process only has to be completed before the subsequent first subject tracking process is started.

Here, the first subject tracking process in step S1109 is a process that is performed between main image capturing and another main image capturing during continuous shooting, and thus the continuous shooting speed improves as the process becomes faster. In contrast, since the second subject tracking process in step S1114 is a process that is performed independently from main image capturing, a tracking process having a high accuracy can be performed while taking time. If the second subject tracking process is completed while the main image capturing process is performed, verification and correction are performed on the result of the first subject tracking process by using the result, and information on the immediately preceding position of the subject recorded in the main memory 1004 is updated.

Also in this embodiment, since the first piece of the plurality of pieces of auxiliary image data is read out in a relatively early stage as described above, the processing time of the subject tracking process can be obtained. This first auxiliary image data and the auxiliary image data obtained subsequently are combined, and the resulting combined auxiliary image data is used in exposure adjustment calculation, processing time of which is relatively short. In this manner, it is possible to obtain the time for the subject tracking process and to perform exposure adjustment calculation by using image data for which the appropriate accumulation period is obtained.

Furthermore, by performing the detailed subject tracking process by using this combined image data in parallel to the main image capturing process, it is possible to perform correction on the position of the subject and to correctly set the tracking range for the next subject tracking process.

While the preferred embodiment of the present invention has been described above, the present invention is not limited to this embodiment, and various modifications and alterations can be made within the scope of the gist thereof. For example, although the description has been given of an example regarding a mirrorless digital single-lens reflex camera to which an image-capturing lens unit is detachable, the similar configuration can be applied to a camera in which the image-capturing lens unit and the camera body are integrated.

Other Embodiments

Additionally, the present invention is realized by executing the following process.

Specifically, the process is a process in which software (program) that implements functions of the above-described embodiments is supplied to a system or apparatus via a network or various kinds of storage media, and a computer (or a CPU or an MPU or the like) of the system or apparatus reads out and executes the program. This program and a computer-readable nonvolatile recording medium storing the program are included in the present invention.

The present invention is not limited to the above-described embodiments, and various modifications and alterations can be made without departing from the spirit and scope of the present invention. Accordingly, following claims are attached in order to clarify the scope of the present invention.

According to the present invention, it is possible to improve the accuracy of the subject tracking function of image pickup apparatuses during continuous shooting.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image pickup apparatus that captures a plurality of main images in a continuous shooting mode, the image pickup apparatus comprising:
an image pickup unit configured to capture a plurality of auxiliary images during an interval between capturing of a main image and capturing of a next main image;
a main subject determining unit configured to determine a main subject;
a first subject tracking processing unit configured to detect a region where a subject that is the same as the main subject exists, from a first region that is a part of a first auxiliary image among the plurality of auxiliary images; and
a second subject tracking processing unit configured to detect a region where a subject that is the same as the main subject exists, from a second region of a second auxiliary image among the plurality of auxiliary images, the second region being larger than the first region,
wherein a result of the detection performed by the first subject tracking processing unit is used in focus adjustment that is performed before the capturing of the next main image, and a result of the detection performed by the second subject tracking processing unit is used in detection of a region where a subject that is the same as the main subject exists, the detection being performed after the capturing of the next main image.

2. The image pickup apparatus according to claim 1, wherein the detection of the region where the subject that is the same as the main subject exists, the detection being performed after the capturing of the next main image, is performed by the first subject tracking processing unit.

3. The image pickup apparatus according to claim 2, wherein the first subject tracking processing unit sets the first region on the basis of the result of the detection performed by the second subject tracking processing unit.

4. The image pickup apparatus according to claim 1, further comprising: a combining unit configured to combine the plurality of auxiliary images; and an exposure adjusting unit configured to perform exposure adjustment calculation of the image pickup apparatus by using an auxiliary image resulting from the combination performed by the combining unit.

5. The image pickup apparatus according to claim 1, further comprising a focus adjusting unit configured to perform focus adjustment on a region that is highly correlated to the main subject and that is detected by the first subject tracking processing unit.

6. The image pickup apparatus according to claim 1, wherein the auxiliary image used by the second subject tracking processing unit has a resolution that is higher than a resolution of the auxiliary image used by the first subject tracking processing unit.

7. The image pickup apparatus according to claim 1, wherein the image pickup unit configured to capture a plurality of auxiliary images includes a second image pickup element configured to generate the plurality of auxiliary images, separately from a first image pickup element configured to generate the main images.

8. The image pickup apparatus according to claim 1, further comprising
a mirror arranged to lead a flux of light having passed through a group of lenses, to the second image pickup element,
wherein the first subject tracking processing unit detects the position of the main subject during an interval between when the mirror enters an optical path for capturing main images after the main image is captured and when the mirror is evacuated from the optical path of capturing main images before the next main image is captured.

9. The image pickup apparatus according to claim 1, wherein the capturing of the next main image is performed while the second subject tracking processing unit is continuously detecting the region highly correlated to the main subject.

10. A method for controlling an image pickup apparatus that captures a plurality of main images in a continuous shooting mode, the method comprising:
an image pickup step of capturing a plurality of auxiliary images during an interval between capturing of a main image and capturing of a next main image;
a main subject determining step of determining a main subject;
a first subject tracking processing step of detecting a region where a subject that is the same as the main subject exists, from a first region that is a part of a first auxiliary image among the plurality of auxiliary images; and
a second subject tracking processing step of detecting a region where a subject that is the same as the main subject exists, from a second region of a second auxiliary image among the plurality of auxiliary images, the second region being larger than the first region, wherein a result of the detection performed in the first subject tracking processing step is used in focus adjustment that is performed before the capturing of the next main image, and a result of the detection performed in the second subject tracking processing step is used in detection of a region where a subject that is the same as the main subject exists, the detection being performed after the capturing of the next main image.

11. A non-transitory computer-readable storage medium storing a program for causing a computer to execute a method for controlling an image pickup apparatus that captures a plurality of main images in a continuous shooting mode, the program causing the computer to execute:
an image pickup step of capturing a plurality of auxiliary images during an interval between capturing of a main image and capturing of a next main image;
a main subject determining step of determining a main subject;
a first subject tracking processing step of detecting a region where a subject that is the same as the main subject exists, from a first region that is a part of a first auxiliary image among the plurality of auxiliary images; and
a second subject tracking processing step of detecting a region where a subject that is the same as the main subject exists, from a second region of a second auxiliary image among the plurality of auxiliary images, the second region being larger than the first region,
wherein a result of the detection performed in the first subject tracking processing step is used in focus adjustment that is performed before the capturing of the next main image, and a result of the detection performed in the second subject tracking processing step is used in detection of a region where a subject that is the same as the main subject exists, the detection being performed after the capturing of the next main image.

* * * * *